May 20, 1930.   C. J. MOSHER   1,759,362
TIRE ALARM VALVE
Filed Jan. 28, 1929
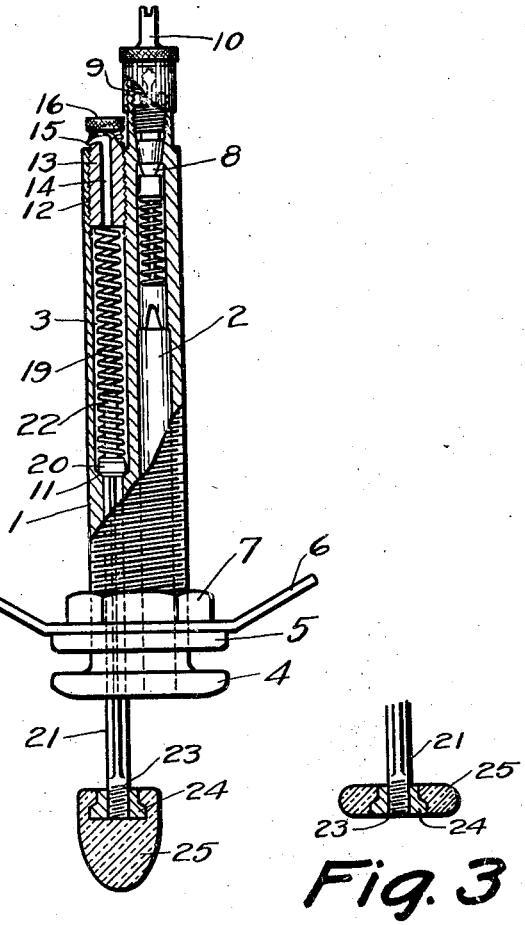
Fig. 1
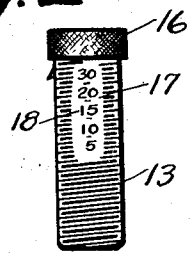
Fig. 2
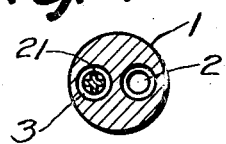
Fig. 3
Fig. 4
INVENTOR
Claud J. Mosher
BY Harry Bowen
ATTORNEY Patented May 20, 1930

1,759,362

UNITED STATES PATENT OFFICE

CLAUD J. MOSHER, OF SEATTLE, WASHINGTON, ASSIGNOR OF FORTY-NINE PER CENT TO SAMUEL C. TAYLOR, OF SEATTLE, WASHINGTON

TIRE-ALARM VALVE

Application filed January 28, 1929. Serial No. 335,401.

The invention is a valve that is particularly adaptable for motor vehicle or other pneumatic tires or containers which is the same size as a motor vehicle tire valve and has the same size air hose connection, which is provided with a double channel with the standard valve in one channel and a whistle in the other and has a plunger extending into the tire or container to operate the whistle when the deflation of the said tire or container reaches a predetermined amount.

The object of the invention is to provide a valve for motor vehicle tires or the like which will automatically blow a whistle as the deflation of the tire reaches a predetermined amount.

Another object of the invention is to provide an alarm valve of the class described which is of the same size as the standard tire valve.

A further object of the invention is to provide an alarm valve for motor vehicle tires or the like which can readily be adjusted for tires of different sizes.

A still further object of the invention is to provide an alarm valve for tires or the like in which the means for giving the alarm may readily be adjusted to different pressures.

And a still further object of the invention is to provide an alarm valve of the class described which is of a simple and economical construction.

With these ends in view the invention embodies a valve casing similar to that of a motor vehicle tire valve having two circular openings extending therethrough, one of the said openings being adaptable to accommodate a standard valve core and having a tip at the outer end of the same size and with the same thread as a standard valve, and the other of the said openings having a whistle screwed in the outer end thereof, a plunger with a spongy object on the end thereof extending through the said valve into a tire or the like, and a spring for holding the upper end of the said plunger against a valve seat.

Other features and advantages of the invention will appear from the following description taken in connection with the drawings, wherein:—

Figure 1 is a side elevation of the said casing with parts broken away showing the interior thereof.

Figure 2 is a side elevation showing the graduation marks on the whistle.

Figure 3 is a vertical section through the lower end of the plunger showing an alternate arrangement.

Figure 4 is a sectional plan through the upper portion of the valve casing looking downward showing the two tubular openings.

In the drawings the device is shown as it would be made wherein numeral 1 indicates the casing, numeral 2 the standard valve chamber and numeral 3 the alarm chamber.

The casing 1 is made similar to a standard tire valve with threads extending continuously down on the outer surface thereof and it will be observed that the lower end is provided with a disc as indicated by the numeral 4, which is placed through the valve opening of the tube and a washer 5 with a guard plate 6 upon it is held against the outer surface of the tube by a nut 7, as shown in Figure 1. The casing 1 is cylindrical with the two circular openings 2 and 3, as shown in Figure 4, extending through it. The circular opening 2 is similar to the opening of a valve stem and is provided with a core as indicated by the numeral 8. This opening extends through a tip 9 at the upper end which is of the same size as the tip of a tire valve and is provided with threads of the same pitch so that a standard cap, as indicated by the numeral 10, and also a standard hose or pump connection may be placed upon the tip when it is desired to insert air into the tube. This much of the valve is similar to a Schrader valve, except that the circular opening 2 is on one side of the center instead of being in the center of the casing 1.

The opening 3 is provided with a shoulder 11 forming a valve seat and the outer end is threaded, as shown at the point 12, so that a cap 13, as shown in Figure 2, may be screwed into the upper end thereof. The cap 13 is provided with an opening 14, which is shaped at the upper end to form a whistle so that as air under pressure passes therethrough and out of the opening 15 it will provide a whistle which may be heard by the operator of the vehicle. The upper end of the cap 13 is provided with a knurled bur 16 by which it may readily be screwed into or out of the end of the opening 3. One side of the cap 13 is provided with a flat smooth surface, as indicated by the numeral 17, so that graduations, as indicated by the numeral 18, may be placed thereon and it will be observed that the cap may be screwed into or out of the opening to adjust the compression of a spring, which is indicated by the numeral 19, and is situated in the opening 3. The lower end of the spring rests upon a valve 20 having a stem 21 extending downward through the lower end of the opening 3 and beyond the end of the casing 1 so that it will project into the interior of a tire in which the valve may be located. The valve 20 may also be provided with a projection 22 at the upper end which will pass upward inside the spring. The valve stem 21 may be made as shown in Figure 4, to permit air to pass upward thereby, and the lower end is provided with a threaded shank 23 upon which a nut 24 having a sponge rubber member 25 permanently mounted thereon may be screwed. The member 25 may be made as shown in Figures 1 or 2 or may be made of any suitable design, shape or size. It will be noted that the design shown in Figure 3 is adaptable for small tires, whereas the design shown in Figure 1 will extend further into the tire and may be considered as more adaptable for tires of a larger size. It is also understood that the length of the valve stem 21 may be adjusted to accommodate tires of any suitable size.

It will be understood that other changes may be made in the construction without departing from the spirit of the invention, one of which changes may be in the shape or design of the casing 1 as it is understood that this casing may be of any suitable type, another may be in the changing of the design of the valve member 20 or in the use of other means for resiliently holding it against the valve seat, and still another may be in the use of other means for adjusting the pressure required to unseat the valve 20.

The construction will be readily understood from the foregoing description. To use the device the member 25 may be inserted in an inner tube or the like through the valve opening and then the valve stem 21 may be placed through the opening and screwed into the member 24. The valve may then be placed in the tube in the usual manner and the remaining portions of the valve assembled with the whistle cap 13 forming a closure for the outer end of the opening 3 and a valve cap 10 forming a closure for the outer end of the opening 2. The member 25 may be made of any suitable spongy material, such as sponge rubber, or may be made of a compartively firm material and covered with a soft material. It will be observed that with the device set to a certain pressure for a certain weight of car the tire may be compressed or flattened by the weight of the car and after the pressure in the tire decreases a predetermined amount the flattened part of the tire will engage the member 25 which will raise the valve member 20 and permit the air to escape through the whistle opening 15. This will spread an alarm which will notify the operator of the vehicle so that he will have an opportunity to stop or change the tire before the tire is actually flat.

Having thus fully described the invention what I claim as new and desire to secure by Letters Patent, is:—

1. In a device of the character described, a valve casing, means for holding the said casing in the inner tube of a motor vehicle tire, means whereby air may be supplied to the tube through the said casing, and suitable alarm mechanism in the said casing to operate to give an alarm when the pressure in the tire passes below a predetermined amount.

2. In a device of the character described, a valve casing having two circular openings extending therethrough, a suitable inlet valve on one side of the casing, said inlet valve being operated by air under pressure passing through the said casing, a suitable outlet valve in one of the openings of the said casing, means for opening the said outlet valve, the stem of which extends beyond the end of the casing, and means for giving an alarm as the said outlet valve is opened.

3. In an alarm valve of the character described, a cylindrical casing having two openings passing therethrough, an inlet valve in one of the said openings, and an outlet valve in the other of the said openings, said outlet valve having a stem extending through the said casing and to a point beyond the end thereof by which the said valve may be operated.

4. In an alarm valve of the character described, a cylindrical casing having a plurality of openings extending through it, an inlet valve in one of the said openings, an outlet valve in the other of the said openings, means extending beyond the said casing for operating the said outlet valve, and a suitable alarm device at the end of the casing operated by a fluid passing through the said outlet valve.

In testimony whereof I affix my signature.

CLAUD J. MOSHER.